No. 763,525. Patented June 28, 1904.

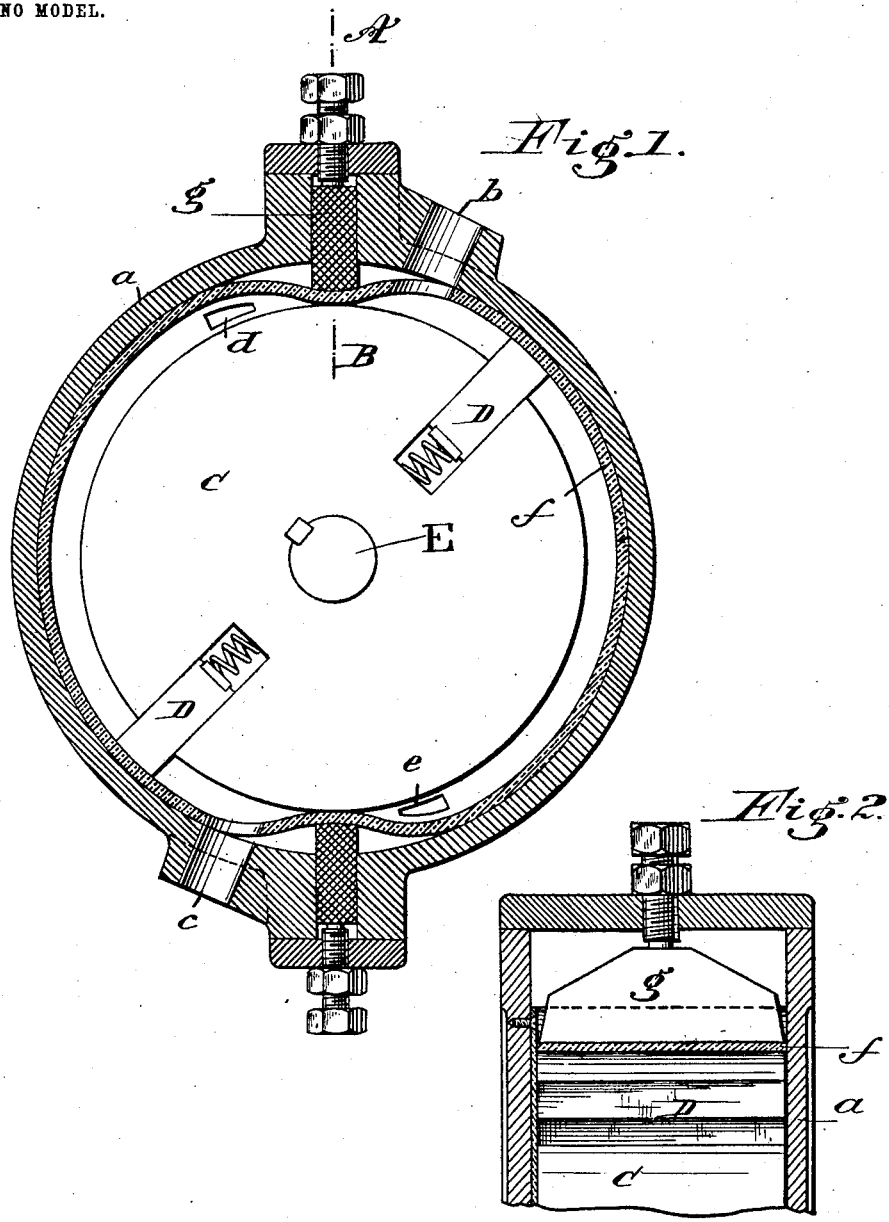

UNITED STATES PATENT OFFICE.

HUGO VAN BERESTEYN, OF BRUSSELS, BELGIUM.

ROTARY MOTOR.

SPECIFICATION forming part of Letters Patent No. 763,525, dated June 28, 1904.

Application filed August 19, 1903. Serial No. 170,020. (No model.)

*To all whom it may concern:*

Be it known that I, HUGO VAN BERESTEYN, a subject of the Queen of the Netherlands, residing at Brussels, Belgium, have invented certain new and useful Improvements in Rotary Motors, of which the following is a specification.

This invention relates to that type of motors wherein a rotary piston having outwardly-pressed wings is mounted within a fixed or stationary cylinder and caused to revolve by steam introduced behind said wings. Heretofore such cylinders have been provided with rigid abutments, between which and the adjacent wing the live steam was admitted; but it has been found in practice that when the piston-wings encounter such abutments objectionable and destructible shocks are caused. According to the present invention this defect is obviated by doing away with such fixed unyielding abutments and inserting a lining within the cylinder which fits snugly upon the greater periphery of the inner wall thereof, but is bulged or undulated inwardly by exterior means at the point where abutments would originally have been located until it contacts closely with the cylindrical surface of the piston.

In the drawings, Figure 1 is a transverse section perpendicular to the main shaft through a rotary engine embodying my invention. Fig. 2 is a fragmentary section on the line A B of Fig. 1.

The fixed or stationary cylinder $a$ chosen for illustration has exhaust-ports $b$ and $c$ diametrically opposite each other and inlet-ports $d$ and $e$ suitably arranged with reference to the exhaust-ports and also diametrically opposite each other. Within this cylinder is mounted the concentric cylindrical rotary piston C, having sliding wings D, spring-pressed outwardly toward the walls of the stationary cylinder. The piston is keyed to the main shaft E, mounted, as usual in this type of rotary engines, on bearings in the side walls or caps of the stationary cylinder. A copper ring or lining $f$ is inserted in the cylinder, fitting exactly upon the inner wall thereof and abutting closely against its caps. Then by means of pressure-plates $g$, occupying the place in the cylinder of the usual abutment and sliding in ways specially prepared in the walls of said cylinder, and by set-screws $h$, acting upon said plates, the adjacent section of the lining is forced down until it comes in close contact with the surface of the piston. The effect of this is to impart to the lining at this spot an easy bulge or slowly-undulated circumferential outline which serves as an abutment, but permits the piston wings or vanes to pass without shock and which can at any time be set up toward the piston to take up wear. The pressure-plates also serve as stops to prevent the lining being circumferentially displaced relative to the cylinder and disarranging the abutments. The lining is of course perforated in registry with the exhaust-ports; but the inlet-ports are always inside said lining just beyond the bulges or abutments. Therefore no special provision is made for them.

Having thus described my invention, what I claim, and desire to secure by Letters Patent, is—

1. In combination with a stationary cylinder and an inclosed rotary piston having outwardly-forced yielding wings or vanes, a lining for said cylinder bulged inwardly against the surface of the piston at suitable points to serve as abutments, but elsewhere fitting closely to the walls of the cylinder.

2. In combination with a stationary cylinder and an inclosed rotary piston having outwardly-forced yielding wings or vanes, a lining for said cylinder bulged inwardly against the surface of the piston at suitable points to serve as abutments, but elsewhere fitting closely to the walls of the cylinder, and stops secured to the cylinder and pressing behind said bulges, to prevent circumferential displacement of the lining and its bulges with relation to the cylinder.

3. In combination with a stationary cylinder and an inclosed rotary piston having outwardly-forced yielding wings or vanes, a lining for said cylinder bulged inwardly against the surface of the piston at suitable points to serve as abutments, but elsewhere fitting closely to the walls of the cylinder, pressure-plates sliding in ways provided in said cylinder behind said bulges, and set-screws whereby said plates may be forced up either to originally form the bulges, or to retain them in close contact with the piston.

HUGO VAN BERESTEYN.

In presence of—
R. WILLIAMS,
GREGORY PHELAN.